Sept. 19, 1939.  H. J. WADDELL  2,173,381
STOP VALVE
Filed April 17, 1936
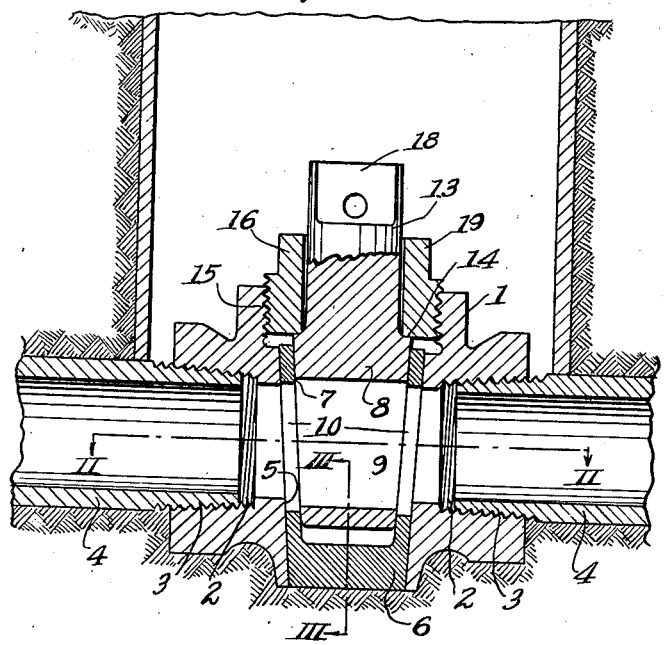
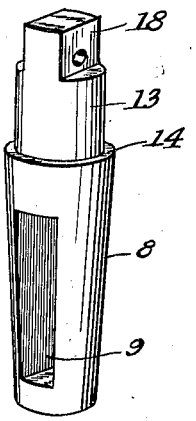
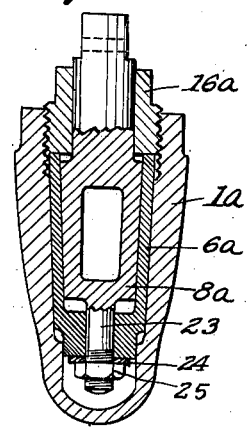
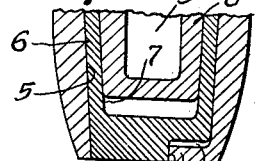
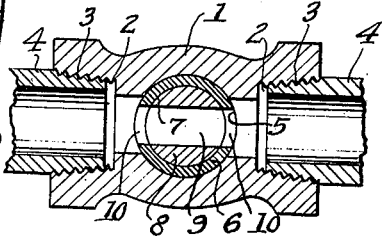
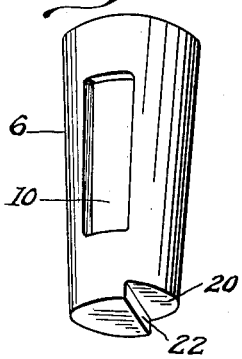
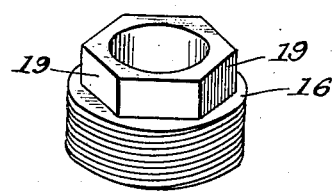
Inventor
Homer J. Waddell
W. S. M. Howell
By
Attorney Patented Sept. 19, 1939

2,173,381

UNITED STATES PATENT OFFICE 2,173,381

STOP VALVE

Homer J. Waddell, Baltimore, Ohio

Application April 17, 1936, Serial No. 74,974

2 Claims. (Cl. 251—103)

This invention relates to improvements in valves, and has particular reference to an improved valve especially adapted for use in connection with street service boxes for the control of fluid passing through underground conduits, as, for instance, in the regulation of gas or water service in muncipalities.

The conventional valve employed in connection with such service is of the tapered plug type wherein the plugs are mounted for turning movement in conical body sockets, the plugs being maintained in such sockets or seats by means of threaded devices connected with the lower ends of the plugs and engaging with the under sides of the valve bodies. Such valves tend to develop leaks and it is necessary from time to time to replace the same with newer and properly operating valves. The replacement of such valves involves considerable work and labor in the form of earth excavations to provide access to the valves, the cutting of pipe with which the valve bodies have threaded connections, the use of coupling sleeves to replace removed pipe and, frequently, the complete loss of the worn devices so replaced.

It is therefore an object of the present invention to provide a stop valve for underground service which may be quickly and easily repaired and worn parts replaced with but a minimum of labor and repair expense.

It is another object of the invention to provide a stop valve including a rotatable conical plug which may be inserted into and removed from the associated valve body without requiring removal of the latter from its secured position upon a pair of communicating pipes.

A further object of the invention resides in the provision of a valve for the uses set forth wherein the conical plug member is rotatably mounted in a stationary but removable sleeve positioned in the plug socket of the valve body, and wherein a tightening nut is provided in connection with the upper portion of the valve body which serves to maintain the valve plug in positive rotatable contact with the inner surfaces of the removable sleeve or thimble in which it is positioned, the arrangement of parts being such that the securing nut, the sleeve or thimble and the plug member may be operatively positioned within the valve body or removed therefrom through an opening communicating with the top of the valve body.

For a further understanding of the invention, reference is to be had to the following description and the accompanying drawing, wherein:

Fig. 1 is a vertical sectional view taken through the valve comprising the present invention and illustrating the same as used in connection with an associated curb service box;

Fig. 2 is a horizontal sectional view taken through the valve on the plane indicated by the line II—II of Fig. 1;

Fig. 3 is a detail vertical sectional view taken through the lower portion of the valve on the plane disclosed by the line III—III of Fig. 1;

Fig. 4 is a detail perspective view of the removable lining sleeve of the valve;

Fig. 5 is a similar view of the rotatable plug member;

Fig. 6 is a detail perspective view of a tightening nut used in the valve;

Fig. 7 is a vertical transverse sectional view of a modified form of valve.

In the specific embodiments of the invention, as illustrated in the accompanying drawing, the numeral 1 designates the body of the valve. Preferably, this body is formed from cast metal and is provided with longitudinally aligned, relatively communicating threaded openings 2 for the reception of the threaded ends 3 of a pair of communicating pipes 4. The vertical axis of the valve body includes a downwardly tapering socket 5 in which is positioned a stationary lining sleeve 6, formed from a corrosion resisting metal, such as a brass alloy. The sleeve 6 closely conforms to the dimensions of the socket 5 to eliminate fluid leaks, but, if desired, a heavy grease or lubricant may be applied to the outer surfaces of the sleeve 6, prior to its insertion into the valve body, to further minimize fluid leaks and to facilitate removal of the sleeve from the valve body when desired. The sleeve 6 is formed internally to include a conical socket 7 for the reception of a rotatable plug member 8, preferably, the latter being formed from a corrosion resisting metal similar to that comprising said sleeve.

The lower portion of the plug member conforms to the configuration of the socket 7 and is formed with a port 9 which is adapted, through the rotation of the plug member, to be brought into and out of registration with ports 10—10 formed in the sleeve 6 and with the openings 2—2 of the body 1.

The upper portion of the plug member terminates in a reduced substantially cylindrical actuating stem 13, an annular horizontal shoulder 14 being formed on the plug member between the upper end of its conical lower portion and the stem 13.

The upper end of the body socket 5 is internally threaded as at 15 to receive a ring nut 16, the stem 13 passing through said ring nut and terminating in a squared wrench receiving projection 18. The lower end of the nut 16 engages with the shoulder 14, so that when said nut is tightened, by means of a suitable tool applied to the exteriorly disposed wrench receiving surfaces 19 thereof, the nut will exert a downward pressure on the plug member to securely force the latter into firm and positive engagement with the inner surfaces of the sleeve 6, and at the same time indirectly pressing on said sleeve to maintain its firm engagement with the walls of the body socket 5.

Rotation of the sleeve is positively prevented by undercutting the bottom of the sleeve as indicated at 20 in Figs. 3 and 4. The bottom of the body 1 and its socket 5 includes a correspondingly formed lip 21 which cooperates with the under-cut portion 20 and the wall 22 thereof to securely retain said sleeve against rotation when operatively positioned within the valve body. If desired, prior to the insertion of the lining sleeve into the valve body, the outer surfaces of said sleeve may be coated with a heavy grease for the purpose of preventing or minimizing fluid seepage between the joints formed by the interengaging walls of the lining sleeve and the valve body. The use of such a lubricant is not ordinarily necessary between the complemental walls of the lining sleeve and the valve plug, since these members are formed from similar corrosion resisting materials and, moreover, may be manufactured under factory controlled conditions assuring close engagement between the complemental walls to prevent or minimize fluid seepage and yet to permit of the ready turning of the plug within the conical socket provided by the removable lining sleeve.

With the use of the present invention, when the valve plug becomes worn, or leaks develop, the condition can be promptly relieved by first removing the ring nut 16, through the application of a suitable socketed wrench to the surfaces 19 thereof. When the ring nut is removed from its threaded connection with the valve body, the plug member and the lining sleeve may likewise be lifted out of the valve body without disturbing the applied position of the valve body in the fluid line. New or mechanically perfect parts may then be substituted for the defective removed parts and the ring nut reinserted in its operative clamping position, as disclosed in Fig. 1. These operations may be quickly executed without involving the removal of an entire valve, as is now customary, the cutting and removal of sections of pipe comprising the fluid transmitting line, or the use of coupling sleeves to replace removed pipe lengths. Therefore, a valve constructed in accordance with the present invention not only minimizes losses due to fluid leaks but enables such service mains to be maintained in a better operating state by reason of the simplicity and low cost involved in effecting repairs.

In the modified form of stop valve shown in Fig. 7, the sleeve member 6a is provided at its lower end with an opening through which a stud 23, formed on the lower end of the plug 8a, projects. On the under side of the sleeve 6a the stud is provided with a washer 24 and nut 25 to firmly seat the plug in the tapered socket provided by the sleeve. In this form, the ring nut 16a threads into the body 1a and engages the upper edge of the sleeve 6a to firmly seat the same in its respective socket. The sleeve 6a may also be provided with flat surfaces at its lower end, as in the preferred form, to insure the proper alignment of ports with the fluid openings in the valve body. If desired, the body may be formed with a closed lower end to prevent entrance of foreign matter around the nut 25.

What is claimed is:

1. A stop valve comprising a body formed to include a central tapered socket and a pair of laterally extending passages communicating therewith, the upper end of said central socket being provided with screw threads, the lower end of said socket being formed to include an irregular shaped portion, a tapered liner positioned in the socket in said body, the lower end of said liner conforming in shape to the irregular portion of said body socket, said liner being formed with a tapered socket and having ports in the side wall in registration with the passages in said body, the lower end of said liner being provided with a reduced bore, a tapered plug having a transversely extending port positioned in the socket in said liner, the lower end of said plug being formed for reception by the bore in the lower end of said liner, means positioned on the lower end of the plug to secure the same in operative engagement with said liner, and a ring nut received within the threaded end of the socket in said body and engaging said liner to maintain the seated position thereof in the valve body socket.

2. In a stop valve for underground fluid mains, a tapered cup-shaped liner formed for insertion in a similarly tapered socket provided in a valve body, the side walls of said liner being formed with a pair of ports, an irregularly shaped extension provided at the lower end of said liner for reception by a similarly shaped portion of the socket in the valve body, the bottom wall of said liner being provided with a reduced opening, a tapered plug having a transversely extending port positioned in the socket in said liner, a reduced extension provided on the lower end of said plug and positioned in the bottom opening in said liner, and means engaging the lower end of said extension to secure said plug in operative engagement with said liner.

HOMER J. WADDELL.